United States Patent [19]

McCabe

[11] 4,165,629
[45] Aug. 28, 1979

[54] MULTI-PUNCH, MULTI-DIE ASSEMBLY FOR STAMPING HOOK-SHAPED DAMPER HINGE MEMBERS

[76] Inventor: Francis J. McCabe, 239 Hastings Ct., Doylestown, Pa. 18901

[21] Appl. No.: 874,001

[22] Filed: Jan. 31, 1978

Related U.S. Application Data

[63] Continuation-in-part of Ser. No. 736,823, Oct. 29, 1976, Pat. No. 4,080,860, which is a continuation-in-part of Ser. No. 650,926, Jan. 21, 1976, Pat. No. 4,004,480.

[51] Int. Cl.² .............................................. B21D 28/14
[52] U.S. Cl. ...................................... 72/325; 72/382; 72/384; 72/418
[58] Field of Search .................. 72/294, 306, 325, 335, 72/381, 382, 384, 386, 400, 411, 465, 418; 113/1 F, 121 A, 121 C, 116 V, 116 Y; 267/177

[56] References Cited

U.S. PATENT DOCUMENTS

| | | | |
|---|---|---|---|
| 1,619,227 | 3/1927 | Widell et al. | 113/116 V |
| 1,904,920 | 4/1933 | Hothersall | 72/465 |
| 2,308,471 | 1/1943 | Schwartz | 72/400 |
| 2,712,768 | 7/1955 | Winkler | 113/116 V |
| 3,426,571 | 2/1969 | Hoffman | 72/335 |
| 3,685,336 | 8/1972 | Black, Jr. | 72/325 |
| 3,685,847 | 8/1972 | Smolka et al. | 267/177 |
| 3,953,999 | 5/1976 | Northey | 72/381 |

Primary Examiner—Lowell A. Larson
Attorney, Agent, or Firm—Benasutti Associates, Ltd.

[57] ABSTRACT

A novel punch and die assembly is disclosed wherein an intermediate punch-and-die member having an aperture defined therein floats between a punch member and a die member. Upon activation, the pucnh-and-die member remains stationary while the punch member deforms a workpiece portion into the aperture. As the deforming operation effected by the punch member is completed, the punch member seats on the punch-and-die member to clamp the workpiece therebetween, after which the biasing of the punch-and-die member into its stationary position is overcome and the punch member, punch-and-die member and workpiece move in unison towards the die member to complete the forming process.

23 Claims, 5 Drawing Figures

MULTI-PUNCH, MULTI-DIE ASSEMBLY FOR STAMPING HOOK-SHAPED DAMPER HINGE MEMBERS

CROSS-REFERENCE TO RELATED APPLICATIONS

The present application is a continuation-in-part of my prior co-pending patent application entitled, "PRESS", Ser. No. 736,823, filed Oct. 29, 1976, now U.S. Pat. No. 4,080,860, which application is a continuation-in-part of U.S. Ser. No. 650,926, filed Jan. 21, 1976, now U.S. Pat. No. 4,004,480, dated Jan. 25, 1977, entitled "PRESS", which patent applications are specifically incorporated by reference as if fully set forth herein.

BACKGROUND OF THE INVENTION

The present invention relates generally to the field of punch and die assemblies and more particularly, punch and die assemblies which are intended to perform multiple forming operations during the activation of the punch through a single unidirectional power stroke.

It is well known to form a single workpiece using punching, stamping, shearing, etc. operations which are performed successively, however, in most instances such operations are performed by moving the workpiece to successive stations where individual punch and die assemblies successively deform various portions of the workpiece in order to attain the desired configuration for the final product. Multiple station operations require, however, either sophisticated mechanisms for transporting workpiece materials from station to station, such as in a roll forming machine, or time consuming hand manipulation of the workpieces through the various forming stages. Additionally, multiple work stations require duplication of equipment, particularly duplication of stamping presses and other actuating equipment which may be relatively expensive to purchase and maintain.

SUMMARY OF THE INVENTION

The present invention relates to the provision of a singled punch and die assembly which is capable of performing punching, shearing, bending,, stamping, drawing and curling operations successively during a single, unidirectional power stroke. The punch and die assembly of the present invention is particularly suited for use with the presses described in my prior co-pending patent applications Ser. No. 736,823, filed Oct. 29, 1976, Ser. No. 650,926, filed Jan. 21, 1976, now U.S. Pat. No. 4,004,480, dated Jan. 25, 1977, each of which patent applications are incorporated by reference as if fully set forth herein. The presses disclosed in the above-mentioned patent applications are believed to be particularly well suited for acutating the punch and die assembly of the present invention by reason of the long continuous and even power strokes produced by these presses. In the preferred embodiment, the punch and die assembly of the present invention is mounted on the press as shown in FIGS. 1-3 of U.S. Pat. No. 4,004,480. As described hereinafter, punch mounting plate 200 corresponds to movable portion 14 disclosed in this patent while die mounting block 400 corresponds to fixed base member 12 disclosed in this patent. Similar correspondence is seen between guide means 16 and 18 disclosed in this patent and the bushings 108 and 110 and rods 104 and 106 described hereinafter.

In the preferred embodiment of the present invention a single floating punch-and-die means is disposed between a punch means and a die means. The intermediate punch-and-die means is biased into a position which is spaced away from the fixed die member by a preselected distance. During the initial phases of the forming process, the punch-and-die means does not move and acts as a die with respect to a movable punch member which, in the preferred embodiment, pierces, shears, bends, draws and stamps a workpiece thereagainst. At the conclusion of these operations, the punch means seats against the workpiece to clamp the workpiece between parts of the punch means and complementary portions of the intermediate punch-and-die means. As the power stroke continues, force is exerted by the punch through the workpiece and directly on the intermediate punch-and-die means to overcome the biasing of the punch-and-die means away from the die means to move the clamped workpiece into engagement with the die portion to perform a curling operation. As the power stroke is completed, part of the intermediate punch-and-die portion acts as a punch with respect to the die means to complete the forming process.

In the preferred embodiment, the top surface of the intermediate, floating punch-and-die means of the assembly receives the workpiece. During the initial phase of the power stroke, a portion of that workpiece is deformed into an aperture or notch defined in the punch-and-die means a portion of said punch means slidingly engaging an interior surface of that aperture. As the punch means, workpiece, and punch-and-die means move towards the fixed member, a portion of the fixed die means penetrates the aperture while a surface of the punch means slidingly engages a surface of that die means. After this sliding engagement has been established, the aforementioned curling operation begins.

The preferred embodiment assembly is designed to receive a substantially T-shaped bracket as a workpiece and to shear and bend a tab from one of the workpiece surfaces into an offset hook-shape, which may be utilized to form an integral hinge in a damper, such as the backdraft damper disclosed in my prior United States patent, U.S. Ser. No. 477,068, filed June 5, 1974, now U.S. Pat. No. 3,908,529, dated Sept. 30, 1975. The present invention thereby facilitates mass production of such dampers in various materials and configurations at a low cost and with a high degree of uniformity.

Accordingly, a primary object of the present invention is the provision of a three-part punch-and-die assembly wherein an intermediate floating portion acts as both a punch and a die with respect to the remaining punch and die portions thereof.

A further object of the present invention is the provision of a simple, low cost assembly for performing a plurality of forming operations including piercing, shearing, bending, stamping, drawing and curling of various portions of a single workpiece in a single power stroke.

A further object of the present invention is the provision of an assembly for economically forming integral hinges in framing material comprising at least one transverse flange.

These and other objects of the present invention will become apparent form the following more detailed description.

DETAILED DESCRIPTION OF THE PREFERRED EMBODIMENT

Figure 1:
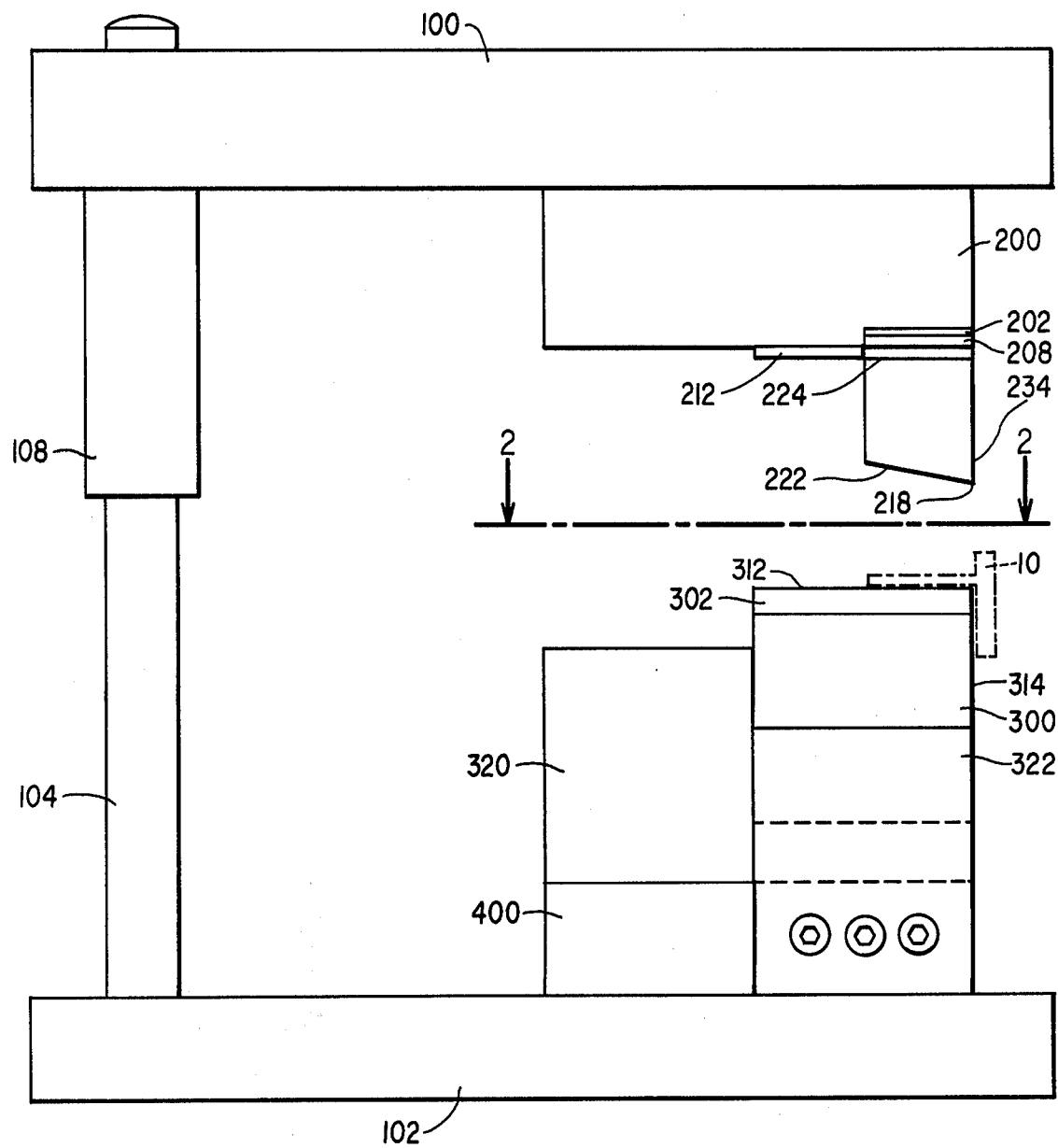
FIG. 1 is a side view of the preferred embodiment assembly of the present invention showing a T-shaped workpiece fitted therein prior to the beginning of the forming operation.
Figure 2:
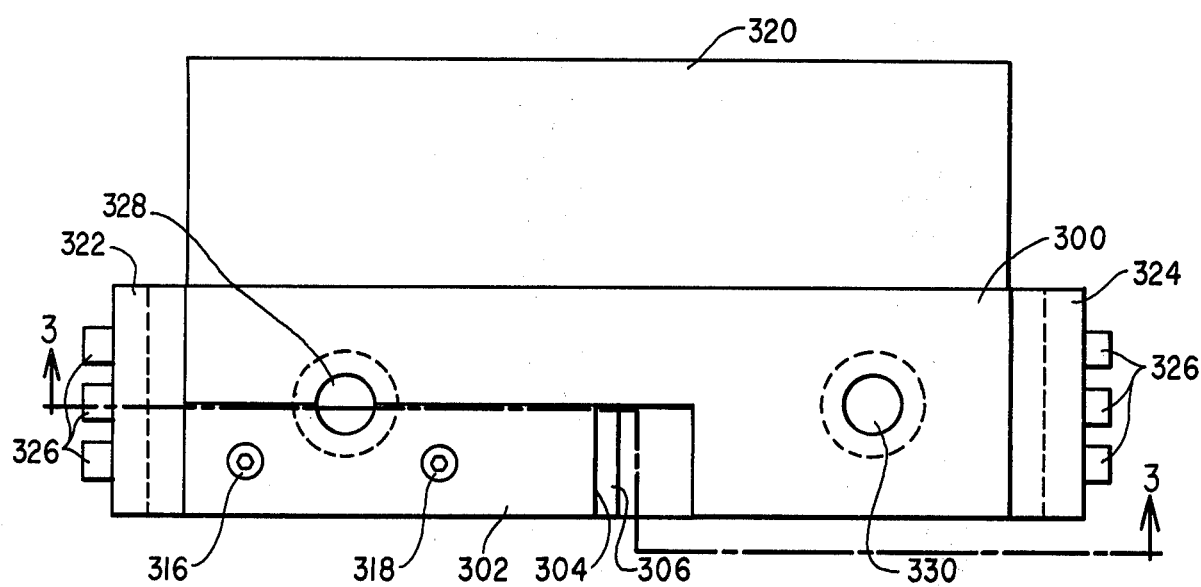
FIG. 2 is a top view of that portion of the apparatus shown in FIG. 1 taken as indicated by the lines and arrows 2—2 in FIG. 1.

Although specific forms of the invention have been selected for illustration in the drawings, and the following description is drawn in specific terms for the purpose of describing these forms of the invention, this description is not intended to limit the scope of the invention which is defined in the appended claims.

The preferred embodiment assembly for forming a workpiece basically comprises a punch-and-die means for receiving along at least one surface thereof at least a portion of a workpiece to be formed, punch means movable with respect to said punch-and-die means for selectively engaging at least a portion of said workpiece between said punch means and said punch-and-die means, and die means for at least deforming a portion of said workpiece, said punch-and-die means and said die means being relatively movable toward said die means when said workpiece is engaged therebetween to bring at least a portion of said workpiece into contact with said die to effect said deforming. In the preferred embodiment, selective relative movement between the punch means and the punch-and-die means additionally deforms at least a portion of the workpiece. The punch means and punch-and-die means are both movable along a single operating axis, the punch-and-die means being biased for a predetermined distance away from its adjacent die means.

Referring now to the drawings, the assembly is seen to include a frame comprising top plate 100 having bushings 108 and 110 extending away therefrom in which are journalled rods 104 and 106 mounted on base plate.

The punch means comprises a punch mounting plate 200 mounted on the undersurface of top plate 100, punch shims 202, 204 and 206, punch stop plates 212 and 214, and main punch member designated generally 216. Punch member 216 is defined into various portions which are labelled to generally correspond to the operations performed thereby during the stroke of the device. Extending longitudinally away from the central portion of the punch are work clamping portions 208 and 210 which are shimmed by shimms 202 and 206 such that the lower surfaces thereof will engage the workpiece after the initial phase of the power stroke is completed. A relatively large projection centrally disposed in the punch member and is oriented generally over an aperture or notch defined in the punch-and-die mounting block 300 and punch-and-die plate 302 disposed directly therebelow. The punch projection is defined into various portions for affecting the deformation of workpiece material disposed therebelow. The leading point with respect to the power stroke (illustrated in FIG. 3 by arrow A) is a piercing point 218. A compound rake is formed away from piercing point 218 to define longitudinal and transverse shearing edges 220 and 222 respectively. During the initial phases of the power stroke (immediately upon piercing) these edges shear a tab from the workpiece, one cut being made along the intersection of the transverse flange with the vertical portion of the workpiece, and the other being made transverse thereto. The projection is formed to have a substantially vertical punch-and-die receiving surface 228 which terminates in transverse shearing edge 222. The purpose of this surface 228, which will be described more fully hereinafter, is to slidingly engage a complementally formed punch receiving surface 310 of the punch-and-die mounting block 300 to stabilize the punch member during the bending operation. Longitudinally, the compound rake terminates in a curved bending portion 232. This bending portion 232 is adjacent to die receiving surface 226 which is shaped to slidingly engage the punch engaging surface 414 of die 406 near the completion of the power stroke, as will be described more fully hereinafter. At the base of the punch projection, stamping ridge 224 is defined while at the base of punch-and-die receiving surface 228 a waste discharge offset 230 is defined in the projection.

Figure 3:
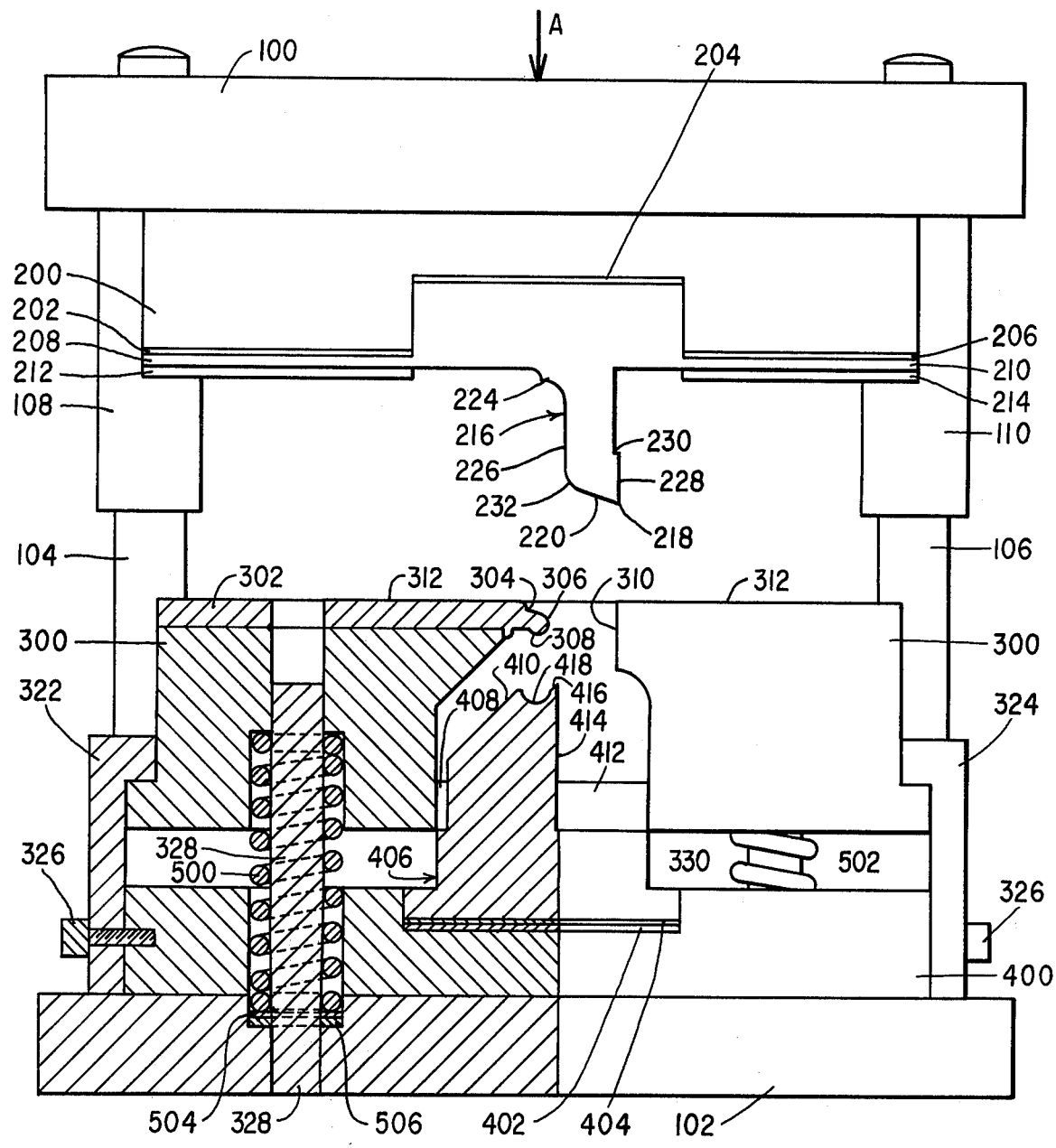
FIG. 3 is a front view of the apparatus shown in FIG. 1 (taken from the right side of that figure), that portion of the apparatus shown in FIG. 2 being shown in partial cross-section in accordance with the lines and arrows 3—3 in FIG. 2.

Referring in particular to FIG. 3, the punch-and-die means is seen to comprise a punch-and-die mounting block 300 on which is mounted punch-and-die plate 302 which has defined thereon a stamping-die-surface 304, bending-die-surface 306, punching-surface 308, punch-receiving-surface 310, horizontal work-receiving-surface 312 and vertical work-receiving-surface 314. The punch-and-die mounting block 300 and punch-and-die plate 302 are attached with set screws 316 and 318, while an adjacent punch-and-die support block 320 and L-brackets 322 and 324 slidingly engage the side and end surfaces of the punch-and-die mounting block 300 to retard movement of the block 300 other than along the operating axis. Punch-and-die shafts 328 and 330 mounted in base plate 102 extend into and are journalled within bores defined in punch-and-die block 300 and punch-and-die plate 302. Portions of these bores are enlarged as shown in particular in the cross-section portion of FIG. 3 to receive heavy duty die springs 500 and 502 which are shimmed by die spring shims 504 and 506 to insure that in the position shown in FIG. 3 these springs are under sufficient compression such that no substantial movement of the punch-and-die block 300 will result until the initial phase of the punching operation is complete and the punch means is fully seated on the workpiece. As shown on the drawings, the L brackets which are bolted to die mounting block 400 by set screws 326 are seen to interfere with portions of the punch-and-die mounting block 300, which interfering portions together comprise stop means for preventing the punch-and-die means from moving more than a preselected distance away from die 406.

As seen particularly in FIG. 3, the die means comprises die mounting block 400 on which the die, designated generally 406, is mounted. Die shims 402 and 404 disposed therebetween adjust the relative position of the die with respect to the remainder of the assembly. Die 406 is seen to comprise a generally upwardly extending projection which extends generally into an aperture or notch defined in punch-and-die mounting block 300. This die projection is defined generally into a series of waste discharge ramps 408, 410, and 412 which tend to gravitationally discharge waste bits which may fall thereon down and out of the apparatus. The tip of the projection is defined into a curl channel 418 which will receive and curl the leading edge of the workpiece which is brought into contact therewith. A substantially vertical punch engaging surface 414 for slidingly engaging punch surface 226 is shown terminating in blunted die tip 416 for initially deforming workpiece material coming in contact therewith and for guiding the workpiece tip into curl channel 418.

The preferred embodiment device operates as follows. For accepting a new workpiece and/or for removing a removing a fully formed workpiece, the various portions of the assembly are positioned as shown in FIGS. 1 and 3 of the drawings. In FIG. 1 such a workpiece is shown in position and is seen to engage both horizontal work receiving surface 312 and vertical work recieving surface 314. When the power stroke commences, plate 100 will be forced downward in the direction of arrow A in FIG. 3 such that piercing point 218 will initially contact the flange of the workpiece resting on work receiving surface 312, while work engaging surface 234 will slide along the interior surface of the workpiece illustrated in phantom in FIG. 1. By engaging an extremely small area of the flange with the piercing point 218, piercing is effected without substantially overcoming the biasing forces exerted by springs 500 and 502 and, therefore, the punch-and-die means remain substantially stationary during this phase of the operation. The compound rake and angles of the shearing edges 220 and 222 away from piercing point 218 are similarly selected such that shearing of a tab from the workpiece will be effected while the punch and die means is stationary. As the power stroke continues and the shearing is completed, the curved bending portion 232 will bend the tab around bending die surface 306. Lateral translation of the punch projection during this phase of the forming process is substantially prevented by the sliding engagement of punch-and-die receiving surface 228 with punch-and-die receiving surface 310. As the punch means begins to approach its position of final relative movement with respect to the punch-and-die means, a stamping operation between stamping ridge 224 and stamping die surface 304 is preformed which creates the desired hinge offset in the finished workpiece.

Figure 4:
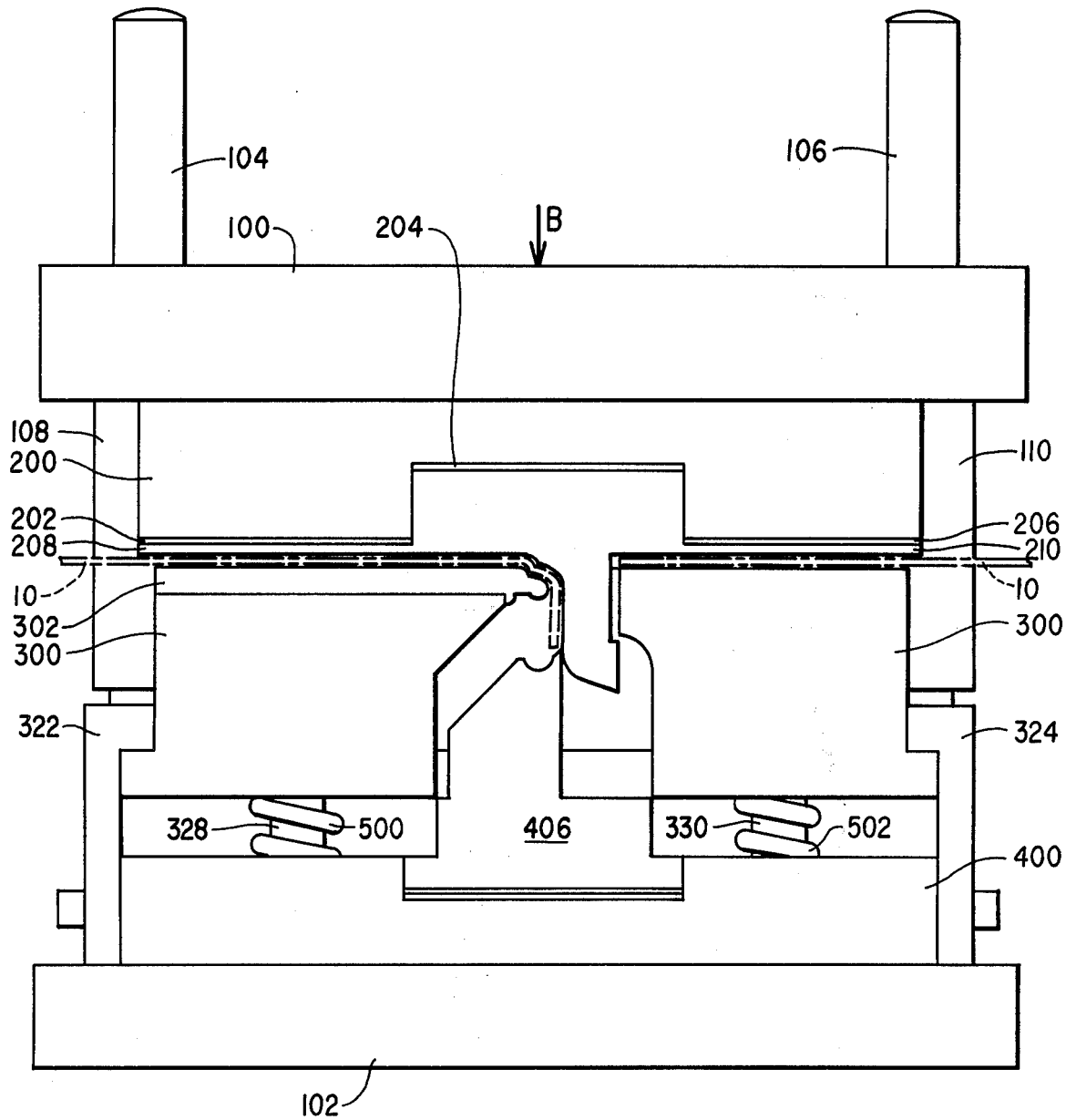
FIG. 4 is a front view of the apparatus shown in FIG. 3 wherein the punch member has completed its forming operations and has seated against the workpiece and punch-and-die member, the vertical portion of the workpiece shown in FIG. 1 having been deleted from FIG. 4 to better illustrate the deformation of the horizontal portion of that workpiece.

Referring now to FIG. 4, each of the above-described operations has been completed and the punch means is fully seated on the workpiece 10 and through punch stop plates 212 and 214, also on work receiving surface 312 of the punch-and-die means. In this position, the workpiece 10 is firmly clamped between the punch means and punch-and-die means and additional force through the terminal phases of the power stroke, as illustrated by arrow B in FIG. 4, will result not only in movement of the punch means but also in movement of the workpiece 10 and punch-and-die block 300 by overcoming the biasing forces of springs 500 and 502. In addition to establishing sliding engagement with punch engaging surface 414, die receiving surface 226, has by sliding over the portion of the workpiece adjacent to bending die surface 306, accomplished a slight drawing action such that the tab of workpiece material created by the punching and shearing operations will tend to curl slightly away from surface 226, at least by the time the punch means has seated on the punch-and-die means. This slight drawing action is illustrated by the slight separation which is evident in FIG. 4 between the end of the workpiece tab and surface 226.

As the power stroke continues to move the punch and die mounting block 300, the tip of the workpiece tab will engage blunted die tip 416 which will guide the tip into curl channel 418 as the power stroke continues. As seen in FIG. 4, any waste material which might have been created during the punching and transverse shearing operations will be allowed to fall between the punch and die mounting block 300 and the offset portion of the punch created by wasted discharge offset 230.

Figure 5:
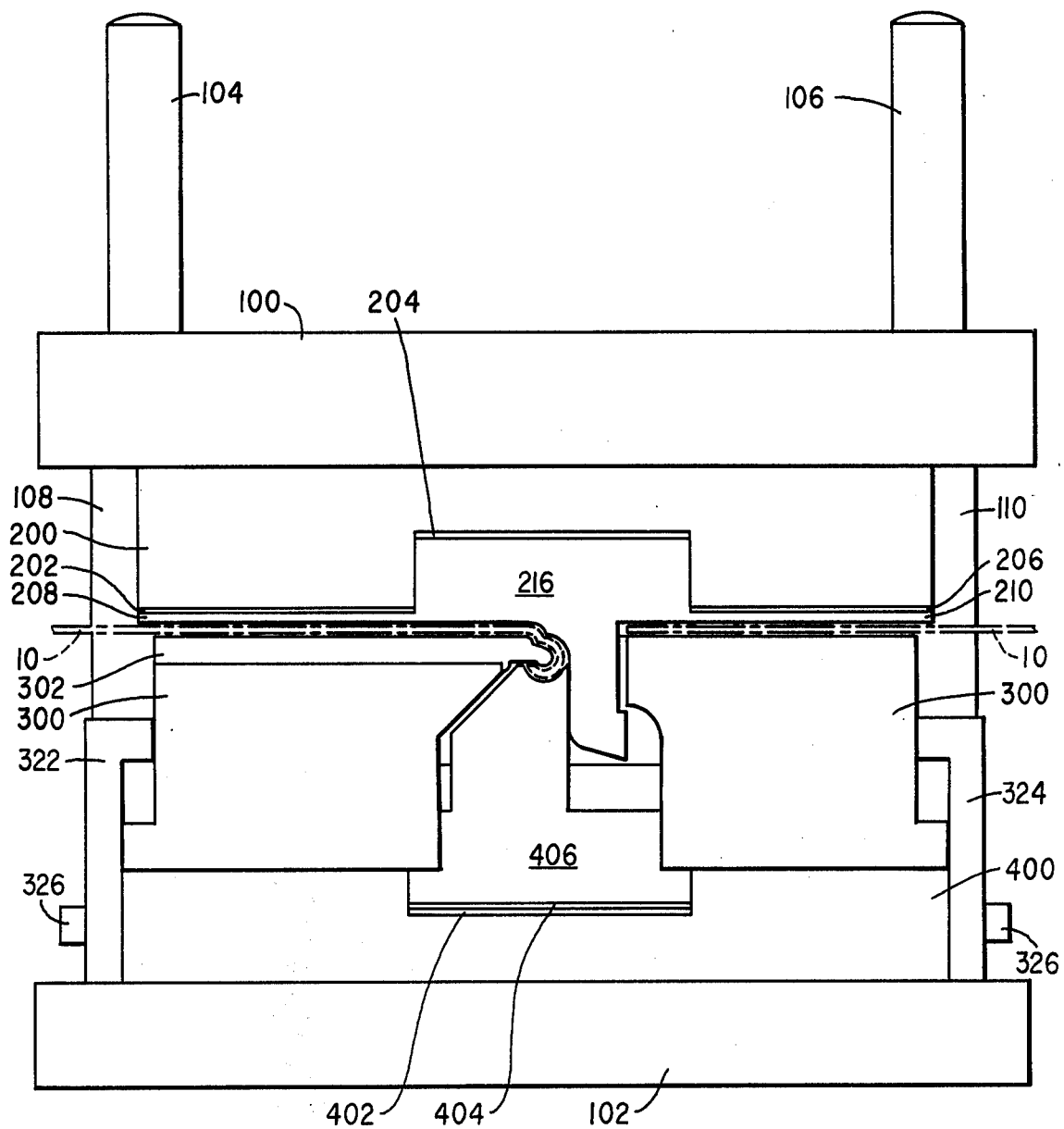
FIG. 5 is a front view of the preferred embodiment apparatus at the completion of the power stroke, and wherein the fully formed workpiece is shown in phantom.

In FIG. 5, the end of the power stroke is illustrated. At this point, the curling operation effected by curling channel 418 will have been completed and the interior curve of the curled portion of the workpiece tab will have been established by the punching action of punching surface 308 of the punch-and-die plate 302. Any waste material which has been produced at the terminal portion of the tab will be discharged from the unit via waste discharge ramp 410 and 408.

The workpiece is now fully formed and top plate 100 should be returned to the positions shown in FIG. 1 and 3, whereupon the workpiece may be removed from the apparatus by sliding it along a transverse axis out of engagement with the tip of punch-and-die plate 302.

As seen from the aforesaid, the preferred embodiment of the present invention utilizes a single power stroke to cut a tab, offset that tab, and form that tab into a hook extending through an arc of between about 225° and 270°. Further, at all phases of the operation the workpiece is engaged and operated on in such a manner as to encourage its alignment with respect to the assembly such that each of the operations performed thereon are performed smoothly and accurately. As a result, an otherwise complex workpiece configuration is simply and effectively formed by a unitary power stroke. It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent and Trademark Office, and is not intended to limit the scope of the invention described and claimed herein.

I claim:

1. An assembly for deforming a workpiece, comprising:
   (a) punch-and-die means for receiving along at least a surface thereof at least a portion of said workpiece;
   (b) punch means movable with respect to said punch-and-die means for selectively engaging at least a portion of said workpiece between said punch means and said punch-and-die means and for deforming a portion of said workpiece during movement of said punch means with respect to said punch-and-die means; and (c) die means for at least further deforming a portion of said workpiece, said punch-and-die means and said punch means being relatively movable in unison toward said die means following said deforming caused by movement of said punch with respect to said punch-and-die means, and when said workpiece is engaged therebetween, to bring at least a portion of said workpiece into contact with said die to effect said further deforming.

2. The invention of claim 1 wherein said punch means and said punch-and-die means are mounted on said assembly for movement along a common operating axis.

3. The invention of claim 2 wherein said assembly further comprises actuating means for driving said punch means along said axis at least toward said die means.

4. The invention of claim 3 wherein continued movement of said punch means along said axis causes said workpiece and said punch-and-die means to move toward said die means.

5. The invention of claim 4 wherein said assembly further comprises resistance means for resisting movement of said punch-and-die means toward said die means.

6. The invention of claim 5 wherein said resistance means comprises biasing means for biasing said punch-and-die means away from said die means and stop means for preventing said punch-and-die means from moving more than a preselected distance along said axis away from said die means.

7. The invention of claim 6 wherein said biasing means further comprises shim means for adjusting the force applied by said biasing means on said punch-and-die means.

8. The invention of claim 1 wherein said punch means comprises means for piercing said workpiece.

9. The invention of claim 1 wherein said punch-and-die means defines an aperture and further wherein at least a portion of said workpiece is deformed into at least a portion of said aperture.

10. The invention of claim 9 wherein said die means comprises a projection extending into at least a portion of said aperture at least during said deforming of said workpiece portion by said die means.

11. The invention of claim 9 wherein said punch means further comprises means for shearing said workpiece.

12. The invention of claim 11 wherein said means for piercing said workpiece comprises a leading point defined by said punch means, and wherein said means for shearing comprises at least one shearing edge raked away from said point.

13. The invention of claim 12 wherein two transverse shearing edges rake away from said point.

14. The invention of claim 9 wherein at least a portion of said punch means is movable to slidably engage an interior surface of said aperture.

15. The invention of claim 10 wherein said die means and said punch-and-die means are movable to slidingly engage portions of each other within said aperture.

16. The invention of claim 1 wherein said punch-and-die means comprises at least two, transverse workpiece receiving surfaces.

17. The invention of claim 12 wherein said punch-and-die means comprises at least two, transverse work receiving surfaces, and wherein said workpiece comprises at least two complementally formed surfaces for engaging said work receiving surfaces.

18. The invention of claim 17 wherein said shearing edge rakes generally away from at least one of said work receiving surfaces whereby engagement of that surface by said workpiece surface will be maintained during shearing.

19. The invention of claim 1 wherein said punch means further comprises at least one surface for slidingly engaging at least a portion of said workpiece during said deforming.

20. The invention of claim 1 wherein said die means further comprises means for discharging waste material resulting from said deforming by said die means from said assembly.

21. The invention of claim 1 wherein said portion of said workpiece is deformed into a hook.

22. The invention of claim 21 wherein said hook is deformed to be offset from at least one surface of said workpiece.

23. An assembly for defoming a workpiece, comprising:

(a) punch-and-die means for receiving along at least a surface thereof at least a portion of said workpiece;

(b) punch means movable with respect to said punch-and-die means for selectively engaging at least a portion of said workpiece between said punch means and said punch-and-die means, selected relative movement between said punch means and said punch-and-die means to engage said workpiece additionally deforming at least a portion of said workpiece, said punch means comprising means for piercing said workpiece and means for shearing said workpiece, and means for piercing said workpiece comprising a leading point defined by said punch means and said shearing means comprising at least two transverse shearing edges raked away from said point, said punch means further comprising means for clearing waste material from said edges after said shearing; and (c) die means for at least deforming a portion of said workpiece, said punch-and-die means and said punch means being relatively movable toward said die means when said workpiece is engaged therebetween to bring at least a portion of said workpiece into contact with said die to effect said deforming.

* * * * *